United States Patent [19]
Guginsky

[11] Patent Number: 5,283,393
[45] Date of Patent: Feb. 1, 1994

[54] ARMORED FLEXIBLE ELECTRICAL CONDUIT WITH FITTINGS

[75] Inventor: Frank Guginsky, Commack, N.Y.

[73] Assignee: Berger Industries, Inc., Maspeth, N.Y.

[21] Appl. No.: 893,794

[22] Filed: Jun. 4, 1992

[51] Int. Cl.⁵ .............................................. H01B 7/18
[52] U.S. Cl. ................... 174/102 R; 174/68.1; 174/74 R; 174/86; 174/109; 439/445
[58] Field of Search ............... 174/102 R, 109, 86, 174/700, 74 R, 68.1, 68.3, 75 F; 439/210, 445, 446, 447, 162, 164, 111, 114

[56] References Cited

U.S. PATENT DOCUMENTS

| | | | |
|---|---|---|---|
| 330,910 | 11/1885 | Levavasseur | 174/109 |
| 1,187,010 | 6/1916 | Rodrigues | 439/446 |
| 1,987,794 | 1/1935 | Phillips | 174/109 |
| 1,995,407 | 3/1935 | Walker | 174/74 R |
| 3,819,849 | 6/1974 | Baker | 174/86 |
| 3,957,084 | 5/1976 | Jung | 138/122 |
| 4,288,700 | 9/1981 | Grass et al. | 174/86 |

*Primary Examiner*—Morris H. Nimmo
*Attorney, Agent, or Firm*—Howard C. Miskin

[57] ABSTRACT

An angularly adjustable angularly adjustable electrical conduit fitting includes an articulate metal conduit bendable at least 90 degrees about an arc having an inside radius of curvature not exceeding 12 inches, the conduit in its preferred from being between 19 ¾ and 20 ¾ inches long in a contracted state and being extendable by between 21% and 23% of its contracted length and having at one end a conduit coupling and at its opposite end a conduit or wall opening connector.

4 Claims, 4 Drawing Sheets

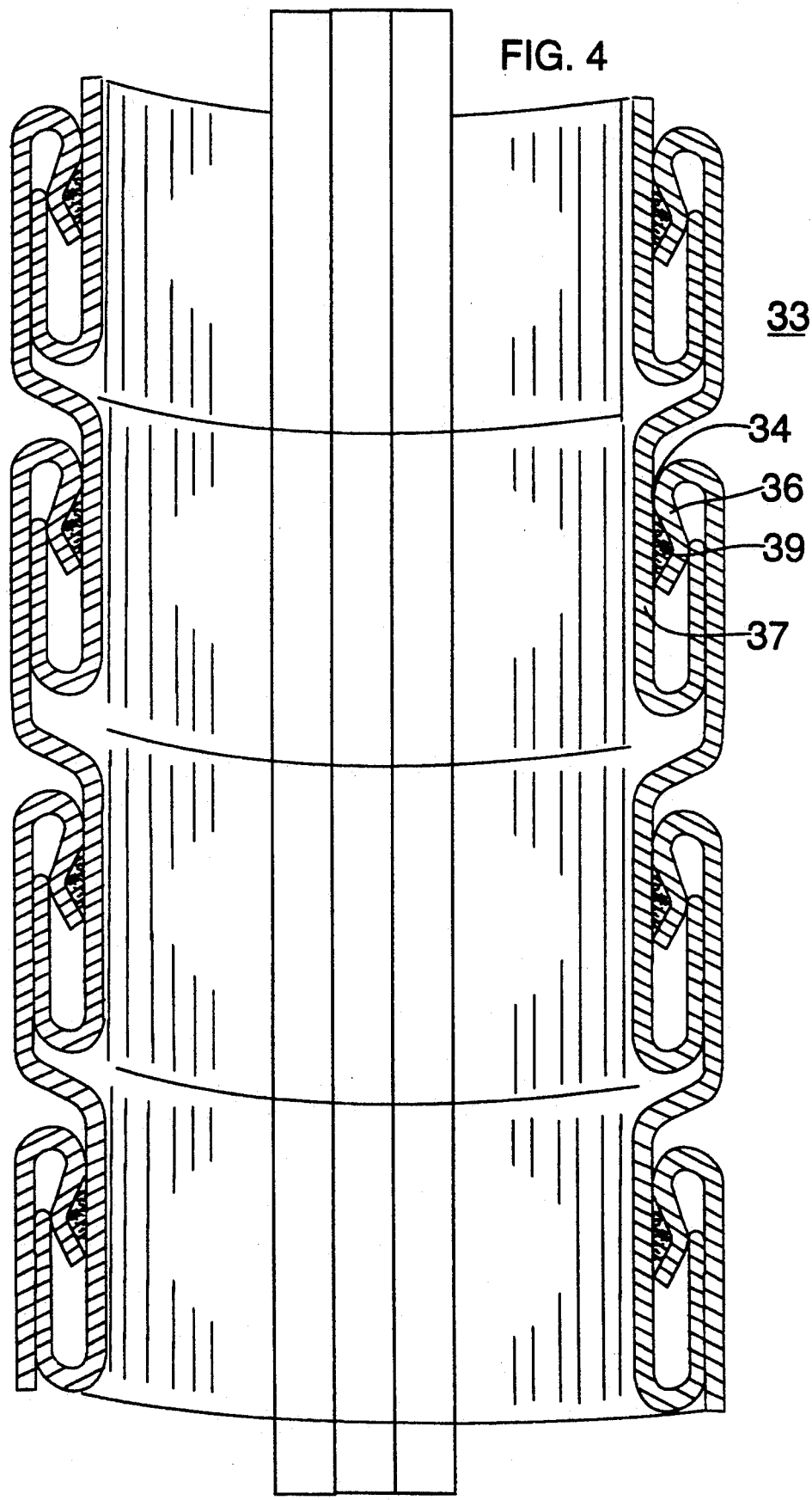

ARMORED FLEXIBLE ELECTRICAL CONDUIT WITH FITTINGS

BACKGROUND OF THE INVENTION

The present invention relates generally to improvements in electrical distribution devices and it relates particularly to an improved angularly adjustable electrical fitting.

In transmitting electricity from a source point to a point of application, it is a common practice to enclose the current carrying cable in rigid metal conduit of limited flexibility to protect the cable from ambient conditions or physical damage and to protect the surroundings from any damage which may be caused by the current carrying cable if not properly enclosed. In the case of rigid conduit, the conduit is available in limited lengths and must be connected end-to-end and at their terminals are usually anchored to walls which are traversed by the cable. Difficulties are frequently encountered in coupling the conduits or anchoring them to an aperture wall since the conduits to be connected are frequently relatively displaced or angularly related. Moreover, in anchoring the conduit end to a wall such as at a circuit breaker or terminal box, the problems of the varying positions are inclinations of the conduit are encountered. Various types of electrical conduit fittings are employed such as angle or straight couplings of known solid construction but these do little to solve the problems of misalignments and other positional discrepancies and being rigid and solid devices are expensive, difficult to compensate for positional and angular variations of the conduit terminals, require the use of many different forms, are time consuming in their application, are of little adaptability and flexibility and otherwise leave much to be desired.

SUMMARY OF THE INVENTION

It is a principal object of the present invention to provide an improved device for use in electrical transmission and distribution systems.

Another object of the present invention is to provide an improved electrical conduit coupling and connecting device.

Still another object of the present invention is to provide an improved device for intercoupling electrical conduit or for connecting an electrical conduit to a ported wall such as to a junction box, a circuit breaker box or the like.

A further object of the present invention is to provide an improved electrical conduit coupling device which is adjustable to compensate for positional and angular displacement of the electrical conduit.

Still a further object of the present invention is to provide a device of the above nature which is rugged, inexpensive, easy to quickly apply, resistant to ambient conditions and of great versatility and adaptability.

The above and other objects of the present invention will become apparent from the reading of the following description taken in conjunction with the accompanying drawings which illustrate a preferred embodiment thereof.

A conduit fitting device in accordance with the present invention includes a flexible conduit bendable for at least 90 degrees along a curve with an inside radius of curvature that is 12 inches or less, and an electrical conduit fitting affixed to each end of the conduit. What is meant by an electrical conduit fitting is a component which may be coupled or connected to an electrical conduit or to a wall in registry with a port or opening in the wall, for example, a wall to a fuse, circuit breaker or junction box or to another electrical conduit fitting. The conduit advantageously is of metal and articulate, being formed of hermetically slidably coupled metal segments, the conduit being longitudinally extendable and contractible.

The conduit is preferably between 19 ¾ and 20 ¾ inches long in its contracted position and is extendable between 21% and 23% of its contracted length. The inside diameter of the conduit is between 2.735 and 2.765 inches. In its preferred construction, at least one of the fittings is a conduit coupling for hermetic connection to an unthreaded conduit and may be of any known construction while the other may include a nut engaged threaded tube stub for tightly engaging an opening in a wall or a tubular stub which may be tightly hermetically engaged to a female electrical coupling or connector of known construction.

The improved conduit fitting device is highly adaptable and versatile, of rugged, inexpensive and reliable construction and easy to apply.

BRIEF DESCRIPTION OF THE DRAWINGS

FIG. 4 is an enlarged medial longitudinal sectional view of a portion similar to that shown in FIG. 3 but of a different embodiment.

DESCRIPTION OF THE PREFERRED EMBODIMENT

Figure 1:
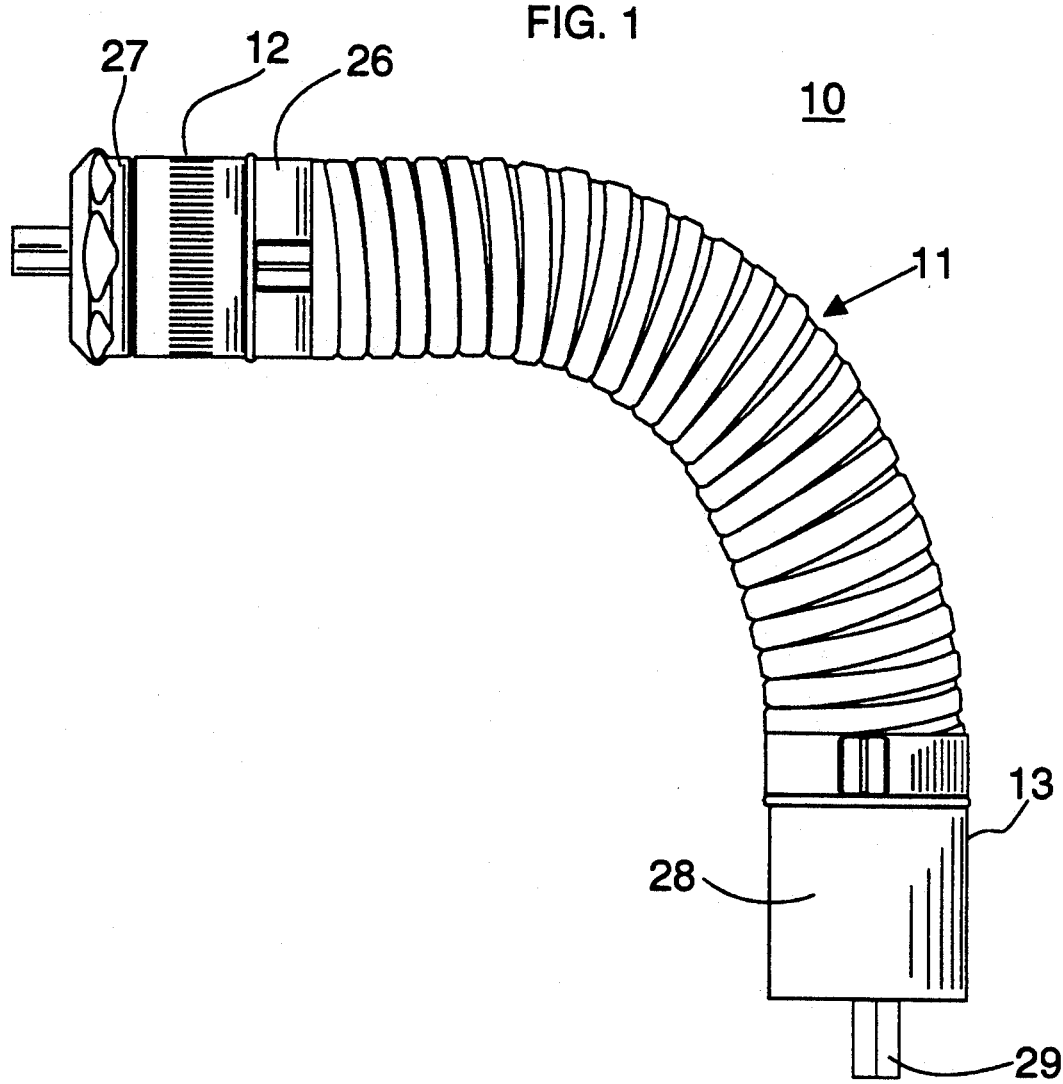
FIG. 1 is a side elevational view of a preferred embodiment of the present invention shown in a 90 degree bent condition.
Figure 2:
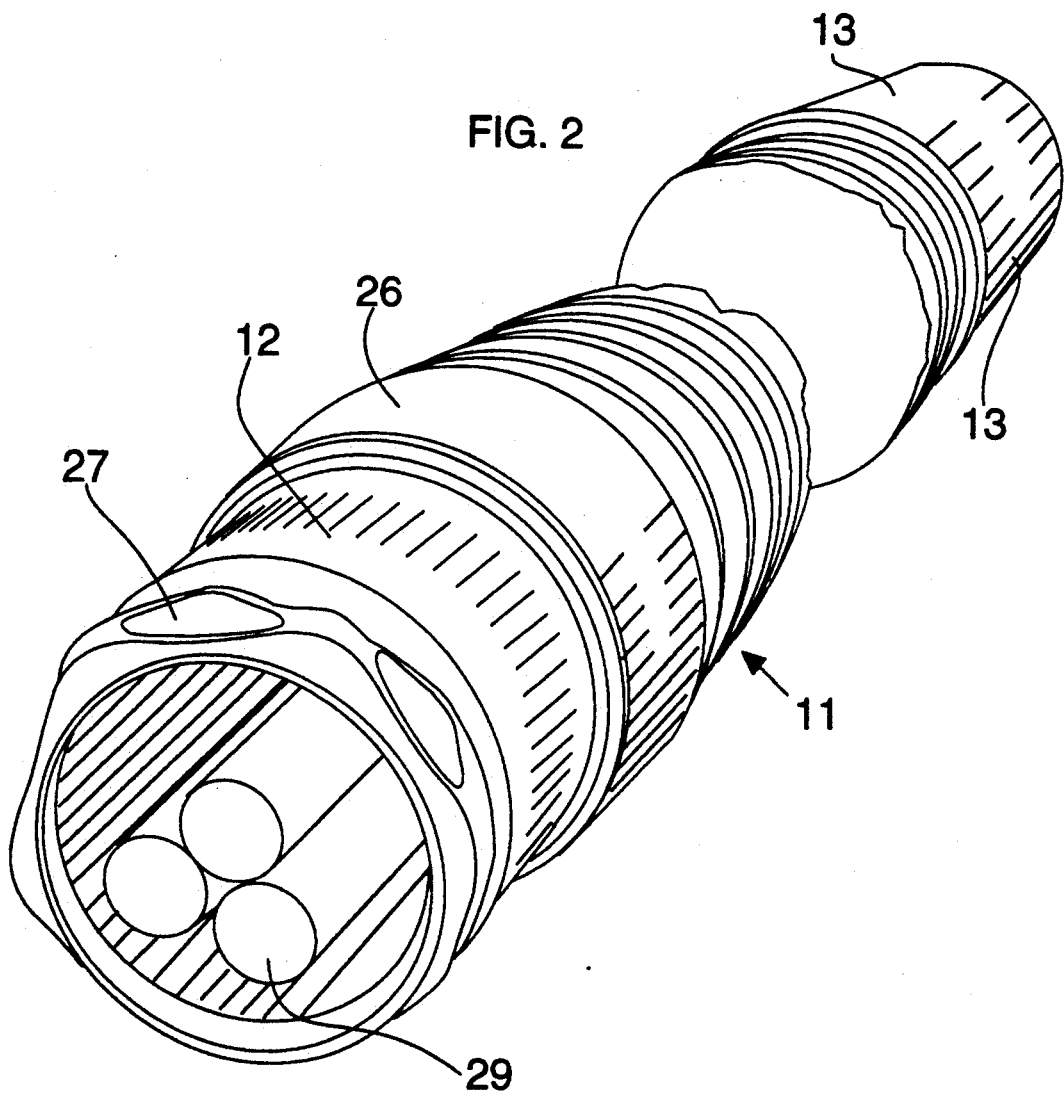
FIG. 2 is an enlarged end perspective view thereof partially broken away and shown in a straight condition.

Referring now to the drawings which illustrate a preferred embodiment of the present invention as applied to the coupling of an electrical conduit (not shown) having a smooth outside end face to an electrical fitting such as of the compression type, the reference numeral 10 generally designates the improved coupling device which includes a flexible hermetically tight metal conduit 11 which is longitudinally extendable and contractible. Affixed in any suitable manner to opposite ends and communicating with conduit 11 are a conduit connector female compression fitting 12 and male tubular coupling 13. While only one of the fittings 12 and 13 should be an electrical conduit connector or the other may be of a known type for connection to a female compression electrical conduit fitting, a wall opening as in the wall of a junction, circuit breaker or fuse box, or circuit box. Fittings 12 and 13 may be of broadly known type and are coupled to conduit 11 in hermetically tight hermetically sealed relationship.

Figure 3:
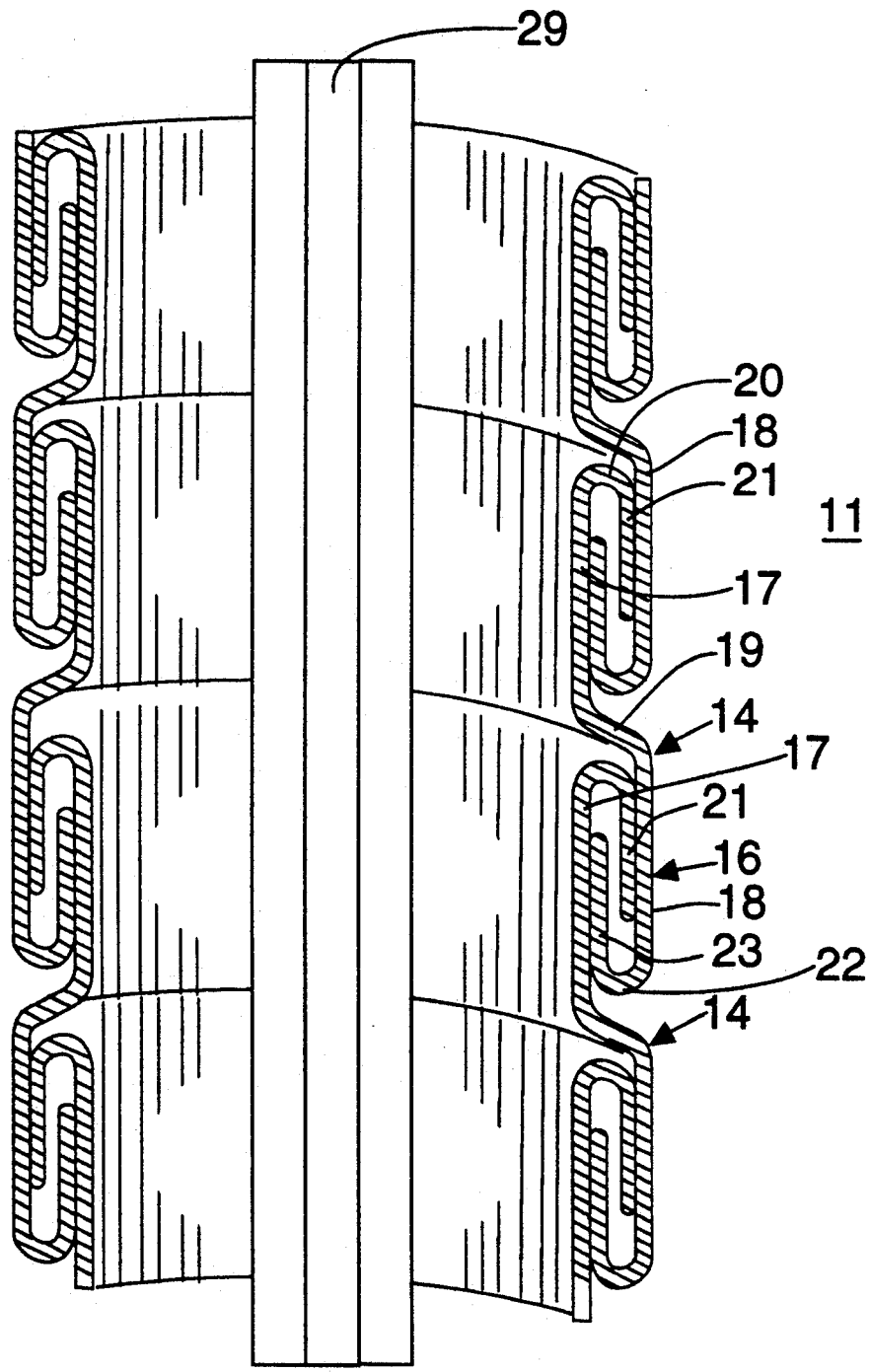
FIG. 3 is an enlarged medial longitudinal sectional view of a portion thereof.

Conduit 11, as best seen in FIG. 3, is articulate including end-to-end coupled cylindrical, preferably resilient metal segments 14 which are relatively longitudinally slidable. Each segment 14 is integrally formed and comprises a longitudinal circular main cylindrical wall which includes an upper cylindrical wall or section 17 and a lower coaxial cylindrical wall or section 18 of greater diameter than that of upper section 17 and joined thereto by an upwardly inwardly inclined annular flange 19. An upwardly arcuate peripheral flange 20 projects outwardly from the upper edge of upper section 17 and terminates in a depending coaxial cylindrical wall 21 which defines a hook vertical free leg. A downwardly convex arcuate peripheral flange 22 projects inwardly from the lower edge of lower cylindrical section 18 and terminates in an upwardly directed coaxial cylindrical wall 23 which defines a hook vertical free leg. The radial outer face of each cylindrical wall 21 overlies and slidably engages and is shorter than the inside face of the lower section 18 of the next successive upper segment 14 and the radial inner face of each cylindrical wall 23 overlies, and is shorter than and slidably engages the radial outer face upper section 17 of the next successive segment 14. The conduit 11 may be longitudinally extended and contracted while being hermetically closed by the close sliding engagement between cylindrical walls 17 and 23 and cylindrical walls 21 and 18 and may be bent in any desired direction while being in a hermetically closed condition with different amounts of relative movement between walls 17 and 23 and walls 21 and 18 at opposite sides of the conduit 11.

One end of conduit flexible 11 is affixed to a female compression fitting 12 of known construction, the fitting 12 having a short tubular projection telescoping the end of conduit 11 which is tightly clamped thereto by a peripheral strap 26 tightly encircling and radially compressing the outer end border of conduit 11 to the telescoping tubular projection strap 26 abutting a peripheral head formed on fitting 12. Alternatively, compression fitting 12 ma be fastened to conduit 11 in various manners, such as welding or the like. Fitting 12 is provided with a gland nut 27 which when tightened compresses a gland or gasket encircling a conduit inserted into fitting 12 to clamp the conduit and effect a hermetically tight coupling in the known member. The male fitting 13 is affixed to the opposite end of flexible conduit 11 in the manner described above in connection with fitting 12, the fitting 13 including a tubular stub portion of the diameter of the standard electrical conduit having the standard EMT diameter and mates the standard conduit (EMT) coupling or connector.

In coupling a pair of conduits or a conduit with a conduit fitting with the electrical fitting device 10, an end of the conduit is telescoped into a respective fittings 12 and clamped fitting 13 is inserted into another female conduit fitting engaging the end of another conduit or other device, the length and flexibility of conduit 11 permitting the adjustment of device 10 to compensate for the spacing and angular deviations of the conduits or related fittings. The fitting 12 is tightened in the usual manner. If one end of a conduit is to be connected to the aperture wall of a circuit breaker or junction box, the fitting 13 is substituted by a conduit engagable fitting having a threaded tubular shank with a peripheral shoulder at its base and insertable through the wall aperture and secured to its border by a matching nut in the known manner. As in conventional fittings, a cable, for example, an insulation covered multiple conductor cable 29 of lesser thickness than flexible conduit 11 and its end fittings 12 and 13 and the connecting conduits traverse the lengths of the conduits and fittings.

As an example of the improved device 10, conduit 11 is 3 1/32 inches in outside diameter, 20 ¼ inches long in its contracted condition, extendable by 22% of its contracted length, bendable about a 12 inch radius of curvature for 90 degrees. It should be understood that the above dimensions and parameters may be modified, for example, as earlier explained.

As shown in FIG. 4 of the drawings 9 which illustrates another embodiment of the present invention which differs from that first described in the construction of the flexible conduit 33 which may be substituted for the conduit 11. The conduit 33 differs from conduit 11 in that a peripheral groove 34 is formed in each cylindrical wall 36 which defines a hook vertical free leg which slidably engages the confronting face of the conduit inside wall 37. Nesting in and filling each groove 34 and tightly slidably engaging wall 37 is an annular packing 39 formed of cotton or other suitable packing material to assure a rain tight and concrete tight relationship between successive conduit segments. In all other respects, the device last described is similar in structure, configuration and application to that first described.

While there has been described and illustrated preferred embodiments of the present invention, it is apparent that numerous alterations, omissions and additions may be made without departing from the spirit thereof.

I claim:

1. An angularly adjustable electrical conduit fitting device comprising an extendible and contractible flexible conduit bendable at least to 90 degrees about a curve having an inside radius not exceeding 12 inches and an electrical fitting secured to and communicating with each end of said conduit, at least one of said fittings being an electrical conduit connector, said conduit being articulate and including a plurality of successive relatively longitudinally slidable segments interlocked against longitudinal separation, each of said segments including a cylindrical body portion having an upper section terminating at its top in an inwardly directed peripheral flange joined to a depending cylindrical upper hook free leg and a lower section coaxial with and of lesser diameter than said upper section and terminating at its bottom in an outwardly directed peripheral flange joined to an upwardly projecting cylindrical lower hook free leg, said depending upper hook free leg having an inner face slidable engaging the outside face of the lower section of the next successive upper segment and said upwardly projecting lower hook free leg having an outside face slidably engaging the inside face of the upper section of the next successive lower segment, one of said hook legs of each of said segments having formed in the face thereof confronting the opposing face of said cylindrical body a peripheral groove, and further including a packing located in said groove and engaging said opposing face.

2. The device of claim 1 wherein said conduit in its fully contracted state is between 19 ¾ and 20 ¾ inches long.

3. The device of claim 3 wherein said conduit is extendable from its fully contracted state between 21% and 23%.

4. The device of claim 1 wherein said conduit has an inside diameter between 2.735 and 2.765 inches.

* * * * *